(12) United States Patent
Nakamura

(10) Patent No.: US 6,999,235 B2
(45) Date of Patent: Feb. 14, 2006

(54) DIFFRACTIVE OPTICAL ELEMENT, METHOD OF PRODUCING SAME, AND OPTICAL APPARATUS

(75) Inventor: Toru Nakamura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/940,620

(22) Filed: Sep. 15, 2004

(65) Prior Publication Data
US 2005/0046947 A1    Mar. 3, 2005

Related U.S. Application Data

(63) Continuation of application No. PCT/JP03/03241, filed on Mar. 18, 2003.

(30) Foreign Application Priority Data

Mar. 18, 2002  (JP) .............................. 2002-074976

(51) Int. Cl.
G02B 5/18     (2006.01)
(52) U.S. Cl. ...................... 359/576; 359/569; 359/558; 359/353; 359/356
(58) Field of Classification Search ................ 359/558, 359/565, 566, 569, 576, 353, 355, 356
See application file for complete search history.

(56) References Cited

U.S. PATENT DOCUMENTS

| | | | |
|---|---|---|---|
| 5,513,289 A | 4/1996 | Hosokawa et al. | |
| 5,946,281 A * | 8/1999 | Ito et al. | 369/112.07 |
| 6,157,488 A | 12/2000 | Ishii | |
| 2004/0125442 A1 * | 7/2004 | Yun et al. | 359/386 |

FOREIGN PATENT DOCUMENTS

JP      A 2000-147226      5/2000

* cited by examiner

Primary Examiner—Fayez G. Assaf
(74) Attorney, Agent, or Firm—Oliff & Berridge PLC

(57) ABSTRACT

A diffractive optical element simultaneously realizes a plurality of optical functions and is small in size and excellent in productivity. The diffractive optical element has a multilayer member composed of a plurality of layers each of which is made of an optical material. Adjacent layers of the multilayer member are in contact with each other, and have different refractive indexes from each other. The multilayer member includes boundary faces between the contacted adjacent layers. Uneven patterns that cause transmitted light to undergo desired diffraction are formed on at least two faces of three faces including the boundary faces and outer surfaces of the multilayer member. The uneven patterns formed on different faces have different shapes or sizes in the direction of the layers of the multilayer member.

18 Claims, 9 Drawing Sheets (a)

(b)

(c)

20 (DIFFRACTIVE OPTICAL ELEMENT)

(a)

(b)

DIRECTION OF LAMINATION

DIRECTION OF LAMINATION (a)

(b)

(a)

(b)

DIFFRACTIVE OPTICAL ELEMENT, METHOD OF PRODUCING SAME, AND OPTICAL APPARATUS

CROSS REFERENCE TO RELATED APPLICATION

This application is a continuation application of International Application PCT/JP03/03241, filed Mar. 18, 2003, and designating the U.S.

BACKGROUND OF THE INVENTION

1. Field of the Invention

The present invention relates to a phase-type diffractive optical element that achieves various optical functions utilizing light diffraction phenomenon, and it also relates to a method of producing the same, and an optical apparatus.

2. Description of the Related Art

A diffractive optical element is a known optical element that utilizes light diffraction phenomenon to realize various optical functions such as a lens function (converging and diverging), wave demultiplexing/multiplexing function, a light intensity distribution converting function, a wavelength filtering function, and a spectroscopic function. In particular, a diffractive optical element that has a spectroscopic function is referred to as grating while a diffractive optical element that has a lens function is referred to as zone plane.

The phase-type diffractive optical element is made by forming an uneven pattern of a diffraction grating on the surface of an optical material (for example, optical glass). The form of the uneven pattern determines an optical function thereof. For example, a grating such as a blaze grating (FIG. 9) has an uneven pattern of an equi-pitch linear form. A zone plate (FIG. 10) has an uneven pattern of a concentric-circular form.

To simultaneously achieve a plurality of optical functions, a plurality of different types of diffractive optical elements each having a single function are disposed in series generally. According to this manner, it is possible to realize a plurality of optical functions of the diffractive optical elements comparatively easily.

However, disposing the diffractive optical elements each having a single function in series is not an effective way of production because for the assembly of an optical system composed of the diffractive optical elements it is needed to accurately align the diffractive optical elements with each other. In addition, the number of required diffractive optical elements increases as the number of functions to be realized increases, which makes it more difficult to produce diffractive optical elements with high accuracy and reduce the size of an optical system.

Thus, there has been proposed another method of forming a combined pattern on a surface of an optical material by combining uneven patterns corresponding to a plurality of intended optical functions. This method aims to realize a small diffractive optical element having multiple functions, however, it is difficult to accurately machine the pattern on the surface because of the complex shape of the combined uneven pattern.

To realize both of the lens function and spectroscopic function simultaneously, for example, an uneven pattern needed to be formed on the surface will be a combination of an equi-pitch linear pattern shown in FIG. 9 and a concentric-circular pattern shown in FIG. 10. The combining is performed by summing up phase modulation of each of the patterns. As shown in FIG. 11, the combined uneven pattern is very complex and their symmetricalness is low.

SUMMARY OF THE INVENTION

An object of the present invention is to provide a diffractive optical element which is small in size and excellent in productivity and which can realize a plurality of optical functions simultaneously, and to provide a producing method thereof and an optical apparatus.

A diffractive optical element according to the present invention includes a multilayer member composed of a plurality of layers each of which is made of an optical material, in which adjacent layers in the multilayer member are in contact with each other and have different refractive indexes from each other. The multilayer member has one or more boundary face(s) between the contacted adjacent layers. An uneven pattern, which causes transmitted light to undergo an intended diffraction, is formed on each of at least two faces of three or more faces including the one or more boundary face(s) and outer surfaces of the multilayer member. The shapes or sizes of uneven patterns formed on different faces are different from each other in the direction of the layers of the multilayer member.

This diffractive optical element can achieve a plurality of optical functions simultaneously by itself since incident light undergoes diffraction a plurality of times, successively transmitting through the faces (at least two faces) on which the uneven pattern is formed. In addition, the diffractive optical element is small in size and excellent in productivity.

Another diffractive optical element according to the present invention includes a multilayer member composed of three or more layers each of which is made of an optical material, in which adjacent layers in the multilayer member are in contact with each other and have different refractive indexes from each other. The multilayer member has therein two or more boundary faces between the contacted adjacent layers. An uneven pattern, which causes transmitted light to undergo an intended diffraction, is formed on each of at least two of the two or more boundary faces, and the shapes or sizes of uneven patterns formed on different faces are different from each other in the direction of the layers of the multilayer member.

This diffractive optical element can achieve a plurality of optical functions simultaneously by itself since incident light undergoes diffraction a plurality of times, successively transmitting through the faces (at least two faces) on which the uneven pattern is formed. In addition, the uneven patterns are formed inside the multilayer member, so that it is possible to surely protect the uneven patterns. Moreover, this diffractive optical element is small in size and excellent in productivity.

Preferably, the diffractive optical element according to the present invention has a multilayer member including two or more resin layers each made of a resin optical material, in which at least two of the two or more resin layers are in contact with each other at their adjacent positions, and at least one of the uneven patterns is formed on a boundary face between the contacted resin layers at the adjacent positions.

The present invention provides a method of producing a diffractive optical element composed of layers, in which uneven patterns are formed on two adjacent layers, respectively, and the uneven patterns cause transmitted light to undergo an intended diffraction and have different shapes or sizes from each other in the direction of the layers. The method includes: a first step of forming a first uneven pattern on a surface of a layer made of a predetermined optical material; and a second step of forming on the first uneven pattern a resin layer made of a resin optical material having a refractive index that is different from that of the predetermined optical material and forming a second uneven pattern on a surface of the resin layer. The second step includes a first sub step of coating a non-cured material of the resin optical material on the first uneven pattern; a second sub step of bringing a mold having an inverted shape of that of the second uneven pattern into contact with the non-cured material; and a third sub step of curing the non-cured material while the mold is in contact therewith.

Preferably, in the third sub step of the method of producing the diffractive optical element according to the present invention, the non-cured material is cured by light radiation.

An optical apparatus according to the present invention includes the above-described diffractive optical element which is disposed in a predetermined optical path of the optical apparatus such that faces on which the uneven patterns are formed cross the predetermined optical path.

Preferably, the optical apparatus of the present invention uses a laser beam. Each of the layers of the diffractive optical element is made of an optical material that is transparent in a wavelength band of the laser beam. The diffractive optical element is disposed such that the faces on which the uneven patterns are formed cross the optical path of the laser beam.

Preferably, in the optical apparatus of the present invention the wavelength band of the laser beam used by the optical apparatus is an infrared wavelength band of 1.4 $\mu$m to 1.7 $\mu$m.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Next, with reference to the accompanying drawings, embodiments of the present invention will be described in detail.

(First Embodiment)

Figure 1:
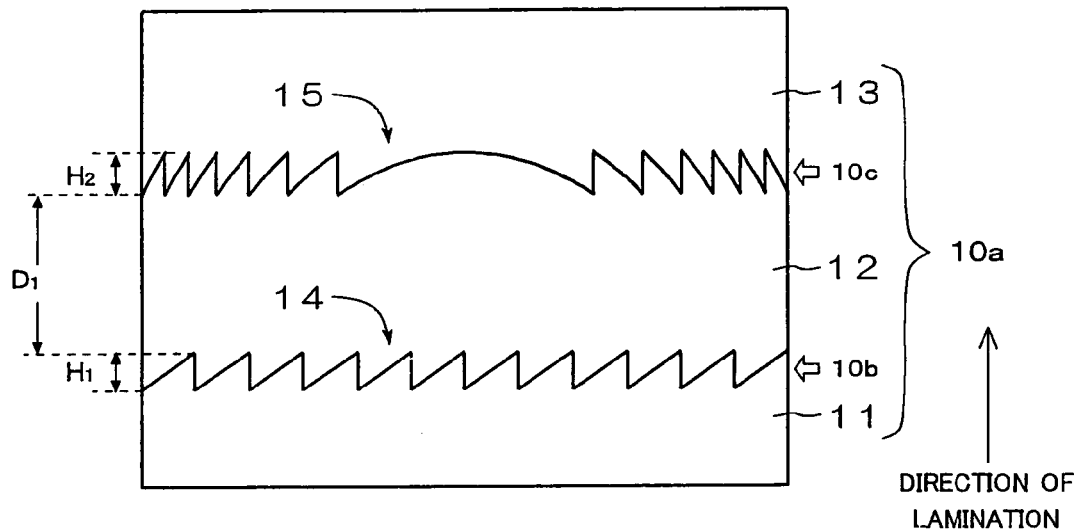
FIG. 1 is a schematic diagram showing the overall structure of a diffractive optical element 10 according to a first embodiment.

As shown in FIG. 1, a diffractive optical element 10 according to the first embodiment is composed of one multilayer member 10a. In addition, the multilayer member 10a is composed of three layers 11, 12, and 13. The layer 11 is made of an optical material having a low refractive index. The layer 12 is made of an optical material having a high refractive index. The layer 13 is made of an optical material having a low refractive index. In other words, the refractive indexes of the adjacent layers 11 and 12 of the multilayer member 10a are different. Likewise, the refractive indexes of the adjacent layers 12 and 13 of the multilayer member 10a are different.

In addition, the optical materials of the three layers 11 to 13 are transparent in a wavelength band (for example, an infrared wavelength band of 1.4 $\mu$m to 1.7 $\mu$m) used by the diffractive optical element 10. Specifically, the material of the layer 11 is optical glass. The materials of the layers 12 and 13 are optical resins. In other words, the layer 11 is a glass layer, and the layers 12 and 13 are resin layers.

For the optical glass as the material of the layer 11 various glass materials can be used such as so-called flint glass whose main component is $SiO_2$—$PbO$—$R_2O$, $SiO_2$—$PbO$—$BaO$—$R_2O$, $SiO_2$—$B_2O_3$—$PbO$—$BaO$, $(SiO_2)$—$B_2O_3$—$La_2O_3$—$PbO$—$Al_2O_3$, $(SiO_2)$—$B_2O_3$—$La_2O_3$—$PbO$—$RO$, $(SiO_2)$—$B_2O_3$—$La_2O_3$—$ZnO$—$TiO_2$—$ZrO_2$, $B_2O_3$—$La_2O_3$—$Gd_2O_3$—$Y_2O_3$—$Ta_2O_5$, $SiO_2$—$TiO_2$—$KF$, $SiO_2$—$B_2O_3$—$R_2O$—$Sb_2O_3$, $B_2O_3$—$(Al_2O_3)$—$PbO$—$RO$, or the like, or crown glass whose main component is $SiO_2$—$RO$—$R_2O$, $SiO_2$—$BaO$—$R_2O$, $SiO_2$—$B_2O_3$—$BaO$, $(SiO_2)$—$B_2O_3$—$La_2O_3$—$RO$—$ZrO_2$, $(SiO_2)$—$B_2O_3$—$La_2 O_3$—$ZnO$—$Nb_2O_5$, $B_2O_3$—$La_2O_3$—$Gd_2O_3$—$Y_2O_3$, $SiO_2$—$B_2O_3$—$R_2O$—$BaO$, $P_2O_5$—$(Al_2O_3$—$B_2O_3)$—$R_2O$—$BaO$, $SiO_2$—$B_2O_3$—$K_2O.KF$, $SiO_2$—$R_2O$—$ZnO$, or the like, or quartz glass or fluorite.

For the optical resins as the materials of the layers 12 and 13, for example polycarbonate, polystyrene, poly(trifluoroethyl methacrylate), poly(isobutyl methacrylate), poly(methyl acrylate), diethylene glycol bis(allyl carbonate), poly (methyl methacrylate), poly(alpha-methyl bromacrylate), poly(methacrylic acid)-2,3-dibrompropyl, diallyl phthalate, poly(phenyl methacrylate), poly(vinyl benzoate), poly(pentachlorophenyl methacrylate), polychlorostyrene, poly(vinyl naphthalene), poly(vinyl carbazole), and silicone polymer can be used as well as various types of resin materials categorized as acrylic resin, urethane resin, epoxy resin, enthiol resin, or thiourethane resin or photo polymer.

In the diffractive optical element 10, the adjacent layers 11 and 12 of the multilayer member 10a are in contact with each other, likewise, the adjacent layers 12 and 13 are in contact with each other. Thus, the multilayer member 10a includes two boundary faces 10b and 10c.

Uneven patterns 14 and 15 in diffraction grating shape are formed on the two boundary faces 10b and 10c in the multilayer member 10a. The shape and size of the uneven pattern 14 are different from those of the uneven pattern 15 in the directions of the layers of the multilayer member 10a. The directions of the layers are two and vertical to a direction of the lamination. The uneven pattern in diffraction grating shape causes transmitted light to be diffracted in a desired manner.

The uneven patterns 14 and 15 will be specifically described. The uneven pattern 14 on the boundary face 10b is an equi-pitch linear pattern shown in FIG. 9, and has a spectroscopic function. On the other hand, the uneven pattern 15 on the boundary face 10c is a concentric-circular pattern shown in FIG. 10, and has a lens function.

Figure 2:
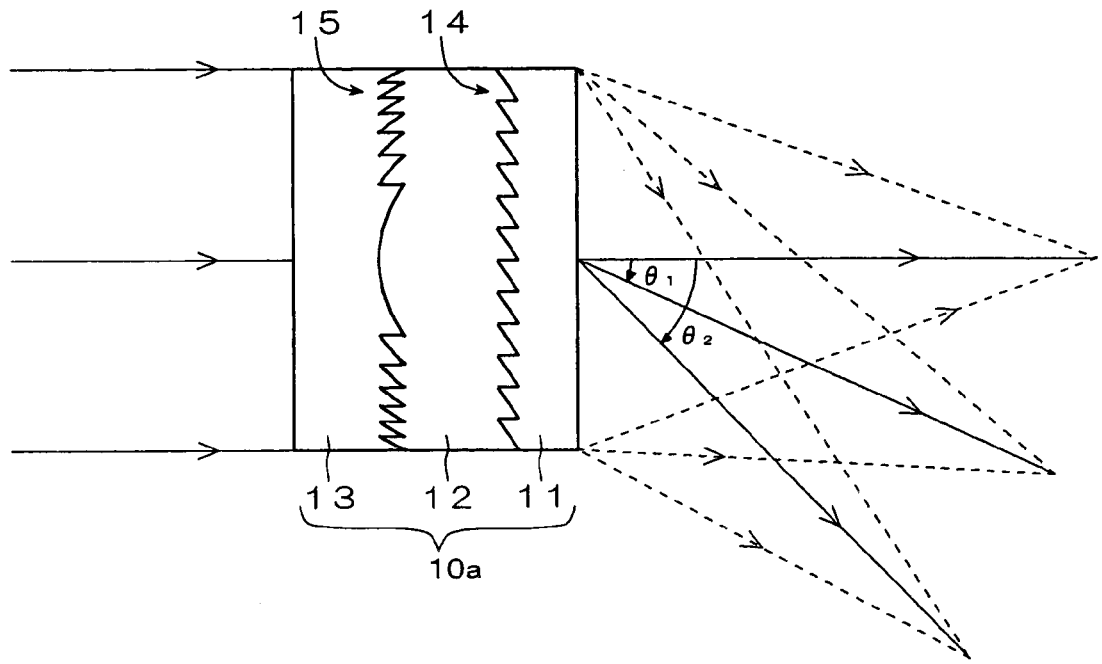
FIG. 2 is a schematic diagram showing an optical path to describe optical functions of the diffractive optical element 10.

In other words, the diffractive optical element 10 according to the first embodiment can simultaneously realize both a lens function and a spectroscopic function. As shown in FIG. 2, light is transmitted through the diffractive optical element 10 and converged by the lens function of the uneven pattern 15. The converged light is diffracted by the spectroscopic function of the uneven pattern 14 into 0-th order diffracted light, first order diffracted light, second order diffracted light, and so on. The 0-th order diffracted light travels straight along the optical axis. The first order diffracted light, the second order diffracted light, and so forth travel at angles $\theta_1, \theta_2, \ldots$ from the optical axis, respectively. FIG. 2 shows only the 0-th order diffracted light, the first order diffracted light, and the second order diffracted light.

To attain a good optical performance, the distance $D_1$ between the grating faces is such that the shorter, the better, preferably 1 mm or less, more preferably 500 $\mu$m or less. With the distance D1 larger than 1 mm, flares increase since the light is bent in an unintended direction. The shorter the distance D1 is, the better obtained optical performance is. However, with easiness of producing the diffractive optical element taken into consideration, the distance $D_1$ should be preferably 5 $\mu$m or larger, more preferably around 10 $\mu$m. The distance $D_1$ corresponds to a length from the top portion of one grating (uneven pattern 14) to the bottom portion of another grating (uneven pattern 15) laminated thereon.

The grating height $H_1$ of the uneven pattern 14 depends on a difference between the refractive indexes of the adjacent layers 11 and 12. The grating height $H_2$ of the uneven pattern 15 depends on a difference between the refractive indexes of the adjacent layers 12 and 13. The grating heights $H_1$ and $H_2$ correspond to distances between the concavities and convexities of the uneven patterns 14 and 15.

Generally, with the uneven patterns in diffraction grating shape having the same optical function, the difference in the refractive indexes of adjacent layers is inversely proportional to the grating height thereof. In other words, with a larger difference in the refractive indexes, the height of the grating can be decreased. In contrast, with a smaller difference in the refractive indexes, the height of the grating need be increased.

In view of the machining accuracy of the uneven patterns 14 and 15, the grating heights $H_1$ and $H_2$ of the uneven patterns 14 and 15 should be preferably small. To prevent incident light inclining to the optical axis from influencing an image, the grating heights $H_1$ and $H_2$ should be also small. To allow the grating heights $H_1$ and $H_2$ to be in a practical range (accurately machine the uneven patterns 14 and 15), It is preferable that the difference in the refractive indexes of the adjacent layers (11 and 12) (12 and 13) is 0.01 or more.

The diffractive optical element 10 according to the first embodiment is produced through the following steps. At step 11, the uneven pattern 14 is formed on the surface of the layer 11. At step 12, the layer 12 is formed on the uneven pattern 14. The uneven pattern 115 is formed on the surface of the layer 12. At step 13, the layer 13 is formed on the uneven pattern 15.

At step 11, the uneven pattern 14 is formed by processing a glass layer (layer 11).

As such processing, for example, one of the following three methods (A) to (C) can be used.

(A) The glass layer is directly machined by cutting or grinding with machines, or plasma CVD (Chemical Vapor Deposition) so as to form the uneven pattern 14 on the surface of the glass layer.

(B) A resist layer finely machined by photolithography is formed on the glass layer, and then a pattern of the resist layer is transferred to the glass layer by ion-etching, forming the uneven pattern 14 on the surface of the glass layer.

(C) A pattern is transferred on the glass layer using a mold so as to form the uneven pattern 14 on the surface of the glass layer (glass mold method). In this method, the use of a low melting point glass having a yield point of 500 Centigrade or less for the optical material of the glass layer makes it possible to lower the temperature at which the uneven pattern 14 is formed, and to thus alleviate the constraint on the heat resistance of the mold. Therefore, an easily cut or ground metal material can be used for the material of the mold.

Figure 9:
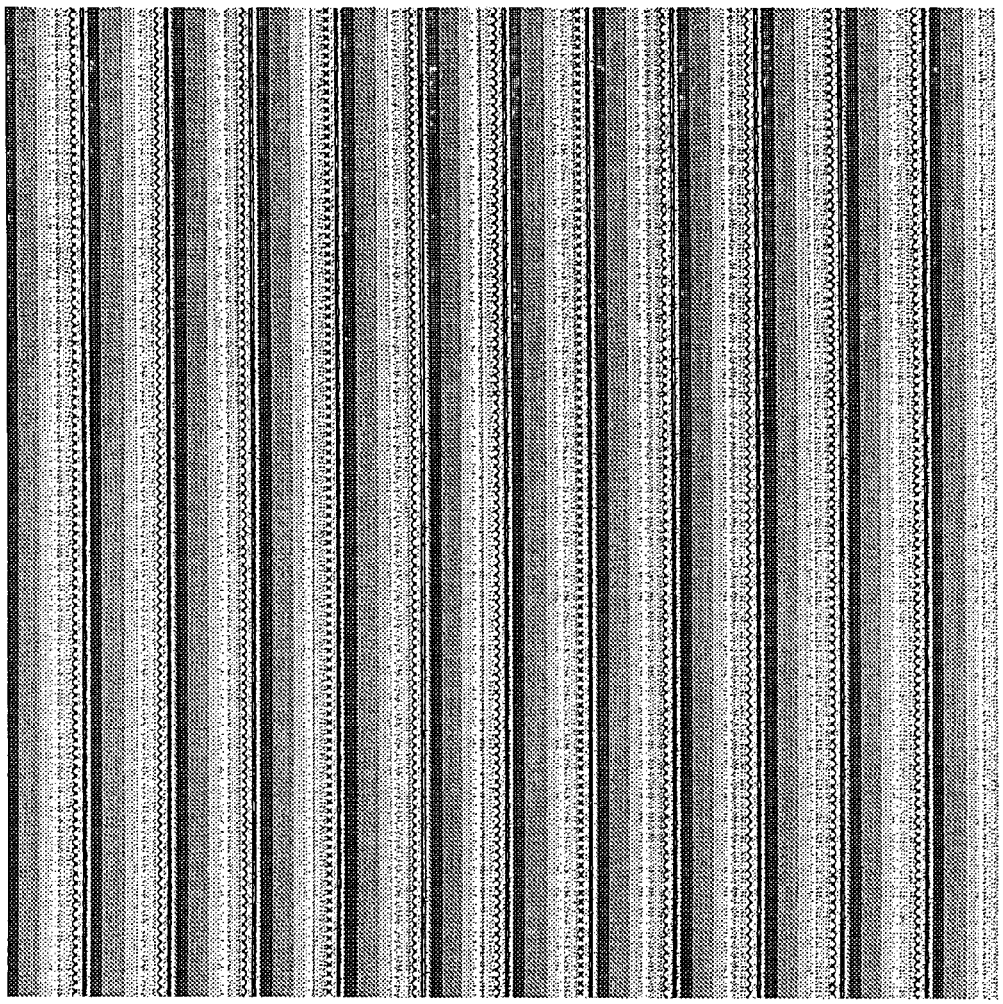
FIG. 9 is a schematic diagram showing levels of successive variation in the height of a grating of an uneven pattern that has a spectroscopic function.
Figure 9:
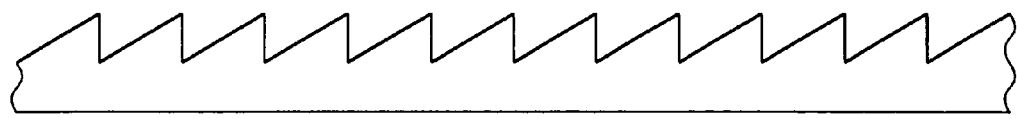

By any one of the three methods (A) to (C), as shown in FIG. 9, the uneven pattern 14 can be easily and accurately made on the surface of the glass layer (layer 11) because of its simple equi-pitch linear pattern.

At step 12, the uneven pattern 15 is formed by processing a resin layer (layer 12).

As such processing, for example, one of the following three methods (D) to (F) can be used.

(D) The uneven pattern 15 is transferred to the surface of the resin layer by injection molding method. (E) A pattern is transferred to the resin layer using a thermal curable or light curable resin and a mold so as to form the uneven pattern 15 on the surface of the resin layer. (F) When the resin layer is a photo polymer, the uneven pattern 15 is formed on the surface of the resin layer by radiating interfered light thereto to produce a hologram.

Next, with reference to FIGS. 3(a) to (c), the method (E) will be described in detail.

First of all, a non-cured material 12a of a resin material is coated on the uneven pattern 14 of the glass layer (layer 11) (FIG. 3(a)). Thereafter, a mold 16 having an inverted shape of the uneven pattern 15 (hereinafter referred to as inverted pattern 15a) is in contact with the non-cured material 12a (FIG. 3(b)), and the non-cured material 12a is filled into the space between the mold 16 and the layer 11.

At this point, it is preferred that the non-cured material 12a should be pressured and spread so that it is filled into the uneven pattern 14 of the layer 11 and the finely formed concave portions of the inverted pattern 15a. The pressured and spread non-cured material 12a is cured by radiating light (for example, ultraviolet ray) from the layer 11 side thereto or heating it. Finally, the mold is removed (FIG. 3(c)). As a result, the resin layer (layer 12) is formed on the uneven pattern 14 and it has the uneven pattern 15 on its surface.

Figure 10:
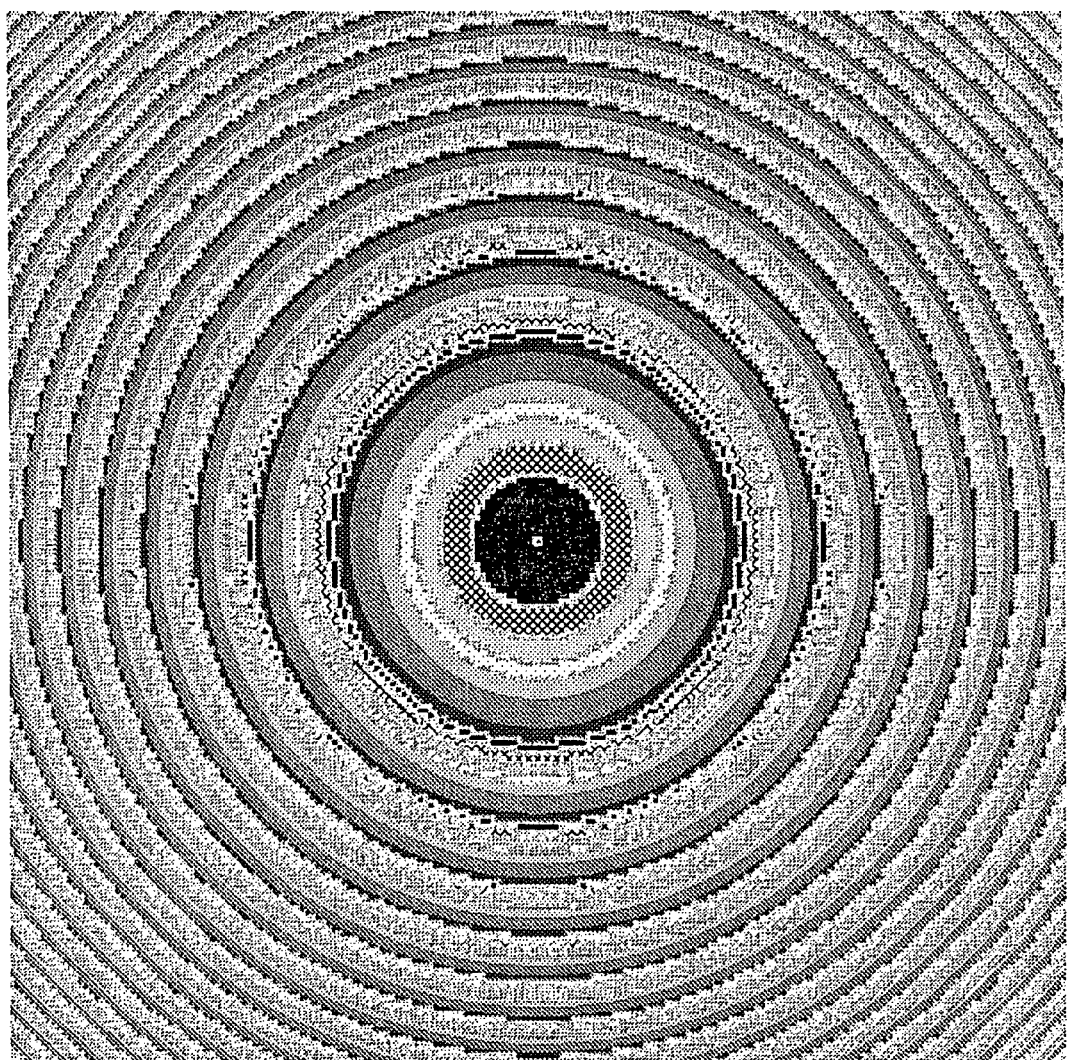
FIG. 10 is a schematic diagram showing levels of successive variation in the height of a grating of an uneven pattern of a zone plate that has a lens function.
Figure 10:
Figure 11:
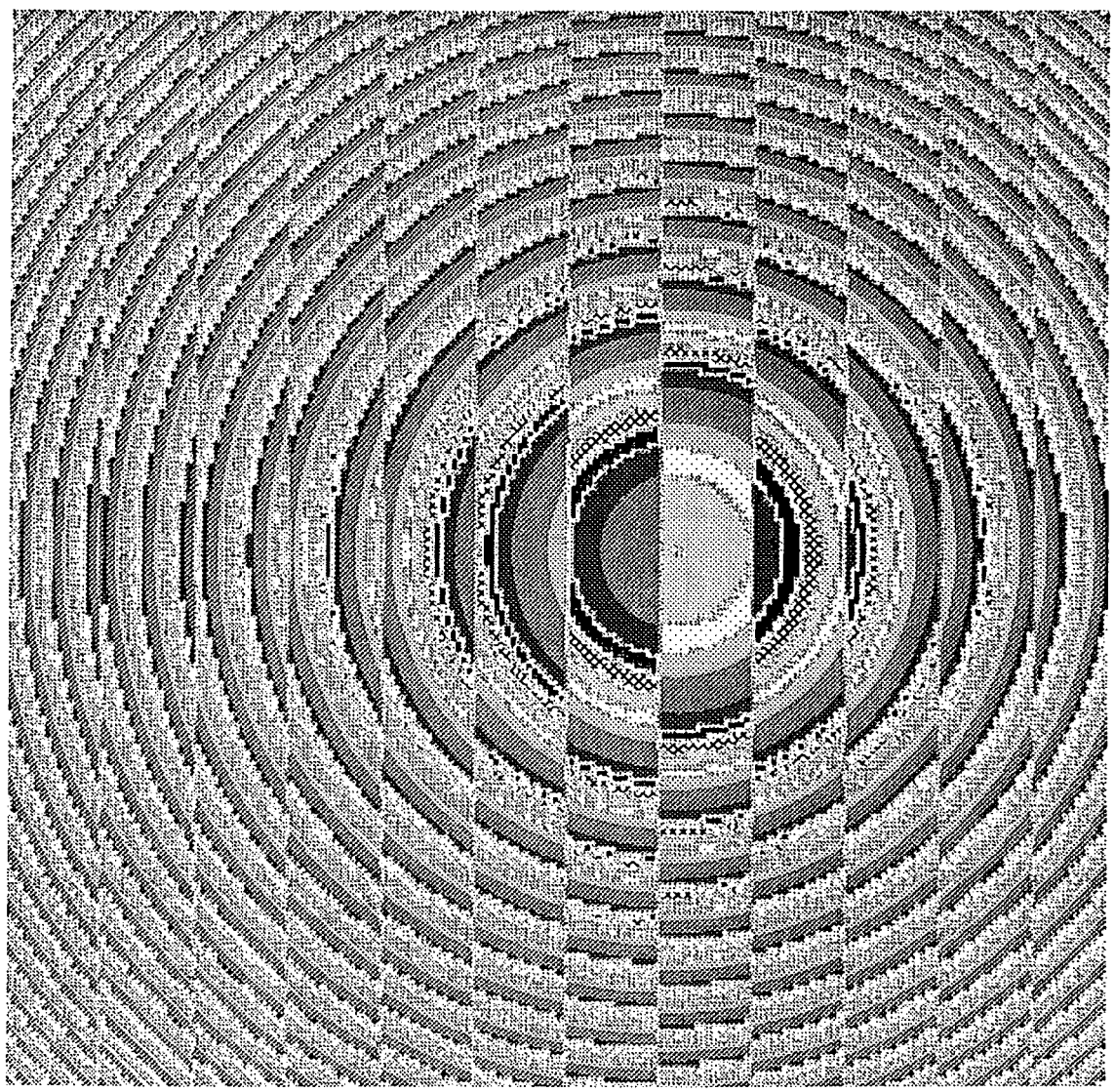
FIG. 11 is a schematic diagram showing levels of successive variation in the height of a grating of an uneven pattern of a conventional diffractive optical element having multiple functions.

By use of any one of the three methods (D) to (F), as shown in FIG. 10, the uneven pattern 15 can be easily and accurately made on the surface of the resin layer (layer 12) because of its simple concentric-circular pattern.

Figure 3:
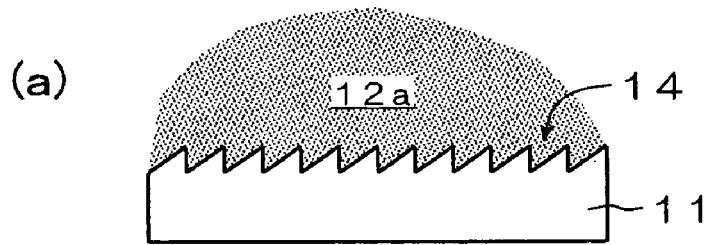
FIGS. 3(a) to (c) are schematic diagrams showing the formation of a layer 12 and an uneven pattern 15 of the diffractive optical element 10.
Figure 3:
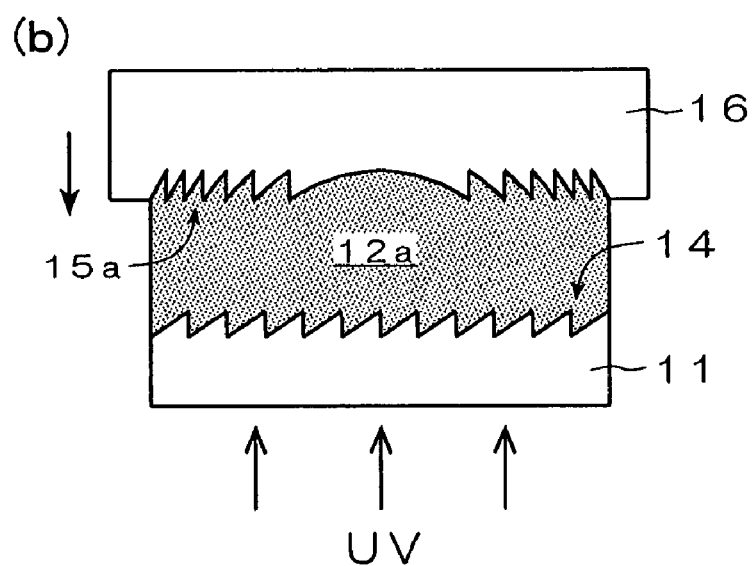
Figure 3:
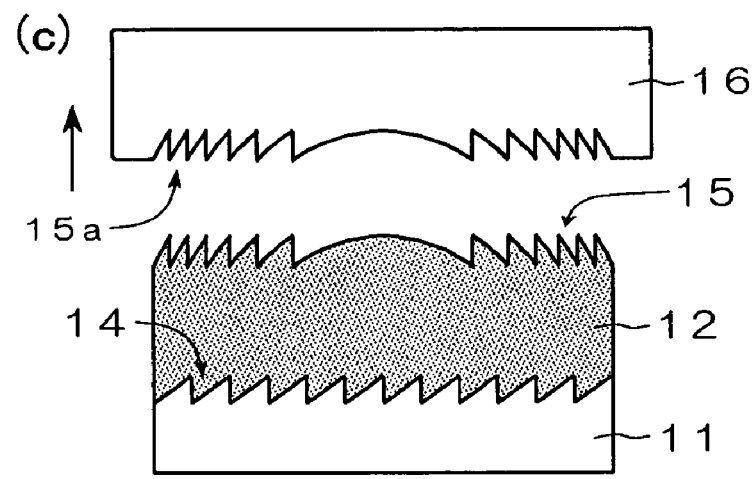

In the method (E) shown in FIG. 3, at step 13, the layer 13 may be formed with use of a tabular mold that does not have an uneven pattern instead of the mold 16 having the inverted pattern 15a.

As a result, the diffractive optical element 10 including the multilayer member 10a having the two simple uneven patterns 14 and 15 successively formed inside is easily producible. As described above, the diffractive optical element 10 can simultaneously realize both a lens function and a spectroscopic function by itself, and it is very small. In other words, according to the first embodiment, it is possible to produce with easiness small highly productive diffractive optical element 10 that simultaneously achieves both a lens function and a spectroscopic function.

(Second Embodiment)

As shown in FIGS. 4(a) and (b), a diffractive optical element 20 according to a second embodiment is composed of one multilayer member 20a. The multilayer member 20a has four layers 21, 22, 23, and 24. Optical materials of the layers 21 to 24 are designated so that the adjacent layers (21 and 22), (22 and 23), and (23 and 24) different refractive indexes from each other. The optical materials of the layers 21 to 24 are optical resins that are transparent in a wavelength band used by the diffractive optical element 20. Examples of these optical resins are the same as those of the foregoing layers 12 and 13.

In the diffractive optical element 20, the adjacent layers (21 and 22), (22 and 23), and (23 and 24) of the multilayer member 20a are in contact with each other. Thus, the multilayer member 20a has boundary faces 20b, 20c, and 20d.

On the three boundary faces 20b, 20c, and 20d of the multilayer member 20a, uneven patterns in diffraction grating shape 25, 26, and 27 are formed, respectively. The uneven patterns 25, 26, and 27 are different in their shapes and sizes in the direction of the layers of the multilayer member 20a.

Next, the uneven patterns 25, 26, and 27 will be practically described. The uneven patterns 25 and 27 on the boundary faces 20b and 20d are equi-pitch linear patterns shown in FIG. 9 and each achieve a spectroscopic function. However, the orientations of the uneven patterns 25 and 27 are rotated by 90° around the direction of the lamination. In addition, the uneven pattern 26 on the boundary face 20c is a concentric-circular pattern shown in FIG. 10, and achieves a lens function.

In other words, the diffractive optical element 20 according to the second embodiment can simultaneously realize a lens function and two types of spectroscopic functions by itself. Thus, light is transmitted through the diffractive optical element 20 and is converged by the lens function of the uneven pattern 26. The converged light is diffracted by the spectroscopic functions of the uneven patterns 25 and 27 into 0-th order diffracted light, first order diffracted light, second order diffracted light, and so forth.

The diffractive optical element 20 is produced in the following steps. At step 21, the uneven pattern 25 is formed on the surface of the layer 21. At step 22, the layer 22 is formed on the uneven pattern 25. The uneven pattern 26 is formed on the surface of the layer 22. At step 23, the layer 23 is formed on the uneven pattern 26. The uneven pattern 27 is formed on the surface of the layer 23. At step 24, the layer 24 is formed on the uneven pattern 27.

As described above, since the layers 21 to 24 of the diffractive optical element 20 are made of optical resins, steps 21 to 23 are performed by repeating step 12 of the diffractive optical element 10. Step 24 is the same as step 13.

As a result, the diffractive optical element 20 including the multilayer member 20a having inside the three simple uneven patterns 25 to 27 successively formed is easily obtainable. As described above, the diffractive optical element 20 can simultaneously achieve a lens function and two types of spectroscopic functions by itself and it is very small. In other words, according to the second embodiment, it is possible to produce with easiness a small highly productive diffractive optical element 20 that can simultaneously achieve a lens function and two types of spectroscopic functions by itself.

The foregoing first embodiment and second embodiment have described on the diffractive optical elements 10 and 20 composed of three layers and four layers, respectively. However, the present invention can be applied to a diffractive optical element composed of a five or more of layers. Regardless of the number of layers of the multiple layer structure, it should be configured that adjacent layers are made of optical materials with different refractive indexes from each other. It is also necessary to get adjacent layers in contact with each other.

Figure 5:
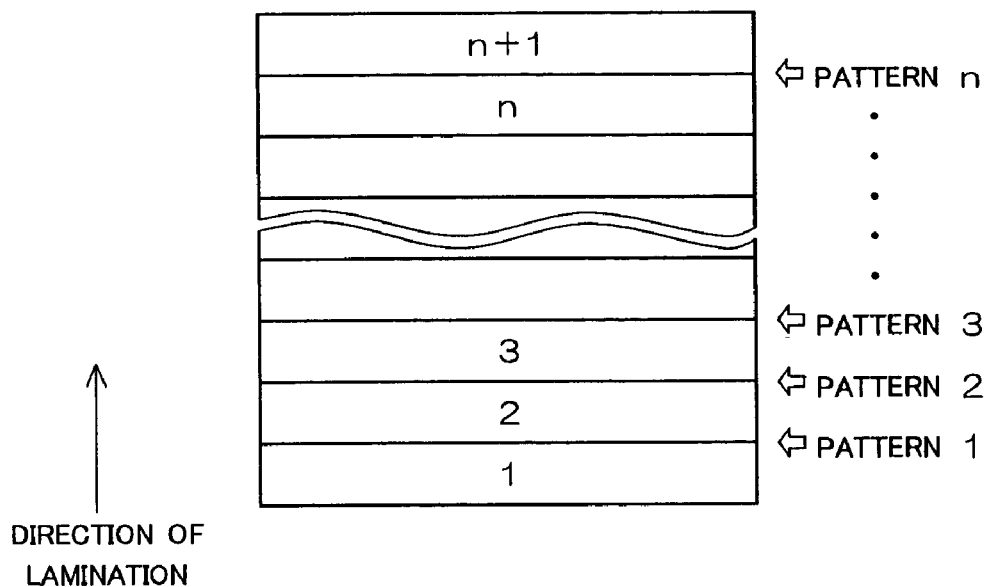
FIG. 5 is a schematic diagram showing a diffractive optical element having a structure of (n+1) layers.

As shown in FIG. 5, with the diffractive optical element of (n+1) layer structure, the multilayer member includes n boundary faces among contacted adjacent layers, so that n different types of uneven patterns can be formed. That is, one diffractive optical element can simultaneously realize n types of optical functions by itself.

Further, optical functions that can be realized by a diffractive optical element are not limited to the combination of a lens function and a spectroscopic function. By varying in the layer direction the shape or size of an uneven pattern formed on the boundary face of adjacent layers, it is possible to realize various types of optical functions such as a wave demultiplexing/multiplexing, a light intensity distribution conversion, a wavelength filter function, and a spectroscopic function. For example, a desired function is obtainable by forming not an uneven pattern of complex shape but an uneven pattern easily formable on any face.

Moreover, regardless of the number of layers (namely, the number of uneven patterns) of a diffractive optical element, the shapes of n uneven patterns formed in a multilayer member are simple and symmetrical. Thus, a small and multi-functional diffractive optical element is obtainable with easiness by forming the uneven patterns successively according to any one of the foregoing methods (A) to (F).

To obtain the foregoing diffractive optical elements, at least two types of optical materials having different refractive indexes are required regardless of the number of layers of the multilayer structure (namely, the number of uneven patterns). With use of two types of optical materials, they are accumulated in turn, in contact with each other, to differentiate the refractive indexes of the adjacent layers.

In addition, according to the foregoing embodiments, uneven patterns in diffraction grating shape are formed on boundary faces among adjacent layers of a diffractive optical element. Alternatively, such an uneven pattern may be formed on outer surfaces of a diffractive optical element. The outer surfaces of the diffractive optical element refer to boundary faces of uppermost and lowermost layers thereof and an atmosphere (for example, air), which normally have different refractive indexes.

Figure 6:
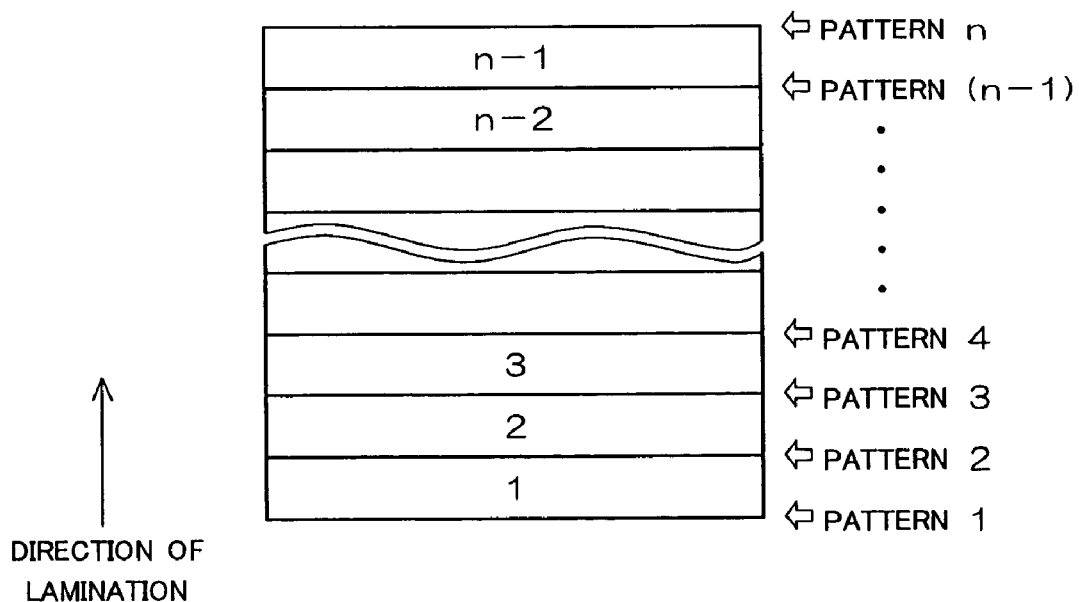
FIG. 6 is a schematic diagram showing a diffractive optical element having a structure of (n−1) layers.

With use of a diffractive optical element of (n−1) layers as shown in FIG. 6, it includes (n−2) boundary faces among adjacent layers and outer surfaces consisting of two faces. Thus, n different uneven patterns can be formed on the boundary faces and the outer surfaces of the diffractive optical element. In other words, one diffractive optical element can simultaneously achieve n types of optical functions. However, to protect uneven patterns, it is preferred that uneven patterns should be formed on boundary faces inside the diffractive optical element.

As described above, since each of the diffractive optical elements according to the present invention is small and multi-functional, it can be easily mounted in various optical apparatuses. For mounting the diffractive optical element in an optical apparatus, the diffractive optical element is disposed in a predetermined optical path of the optical apparatus such that the faces on which the uneven patterns are formed cross the predetermined optical path.

In particular, when the diffractive optical element according to the present invention is incorporated into an optical apparatus that uses a laser beam, the diffractive optical element is disposed so that the faces of the uneven patterns cross the optical path of the laser beam. It is preferred that each layer of the diffractive optical element should be made of an optical material that is transparent in a wavelength band of the laser beam.

Moreover, there has been a strong demand for optical elements of optical apparatuses (repeaters and demultiplexers) for the optical communication to be smaller and thinner in size and have multiple functions. Thus, it is especially useful to mount the diffractive optical element according to the present invention in such optical apparatuses. These optical apparatuses used for the optical communication use laser beams in an infrared wavelength band (1.4 μm to 1.7 μm).

When the diffractive optical elements 10 shown in FIG. 1 and FIG. 2 are mounted in an optical apparatus used for optical communication, 0-th order diffracted light of light transmitted through the diffractive optical element 10 can be incident as a spot into a downstream optical system. In addition, for example, first order diffracted light (light that travels with an angle of $\theta_1$ to the optical axis) can be extracted as monitor light. This is because the first order diffracted light forms spots that differ in each wavelength by the spectroscopic function of the diffractive optical element 10.

(Third Embodiment)

A third embodiment of the present invention shows the diffractive optical element 10 of the first embodiment (FIG. 1) in a more specific manner. In the following, the structure and producing steps of one compositional example of the multilayer member 10a of the diffractive optical element 10 will be described. According to the third embodiment, as the optical material of the layer 11, low melting point glass K-PSK60 made by Sumita Optical Glass Inc. (nd=1.591, At (yield point)=404° C.) is used. As the optical material of the layer 12, urethane acrylate type UV-curable resin (nd=1.554) is used. As the optical material of the layer 13, fluorine contained methacrylate type UV-curable resin (nd=1.505) is used. They are alternatively laminated.

The grating height $H_1$ and the pitch (equi-pitch) of the uneven pattern 14 formed on the boundary face 10b of the adjacent layers 11 and 12 of the multilayer member 10a are 15.88 μm and 17 μm, respectively. The grating height $H_2$, the pitch (at the center portion), and the pitch (at the outermost peripheral portion) of the uneven pattern 15 formed on the boundary face 10c of the adjacent layers 12 and 13 of the multilayer member 10a are 11.99 μm, 187.8 μm, and 5.0 μm, respectively. The distance between the grating faces $D_1$ on which the uneven patterns 14 and 15 are formed is 30 μm.

The steps of producing the diffractive optical element 10 according to the third embodiment are the same as steps 11 to 13 according to the first embodiment. At step 11, the glass mold method (C) is used (FIG. 7(a)). At step 12, the method (E) is used (FIG. 7(b)). At step 13, the method (E) is also used (FIG. 7(c)). Details of the method (E) are shown in FIGS. 3(a) to (c).

Figure 7:
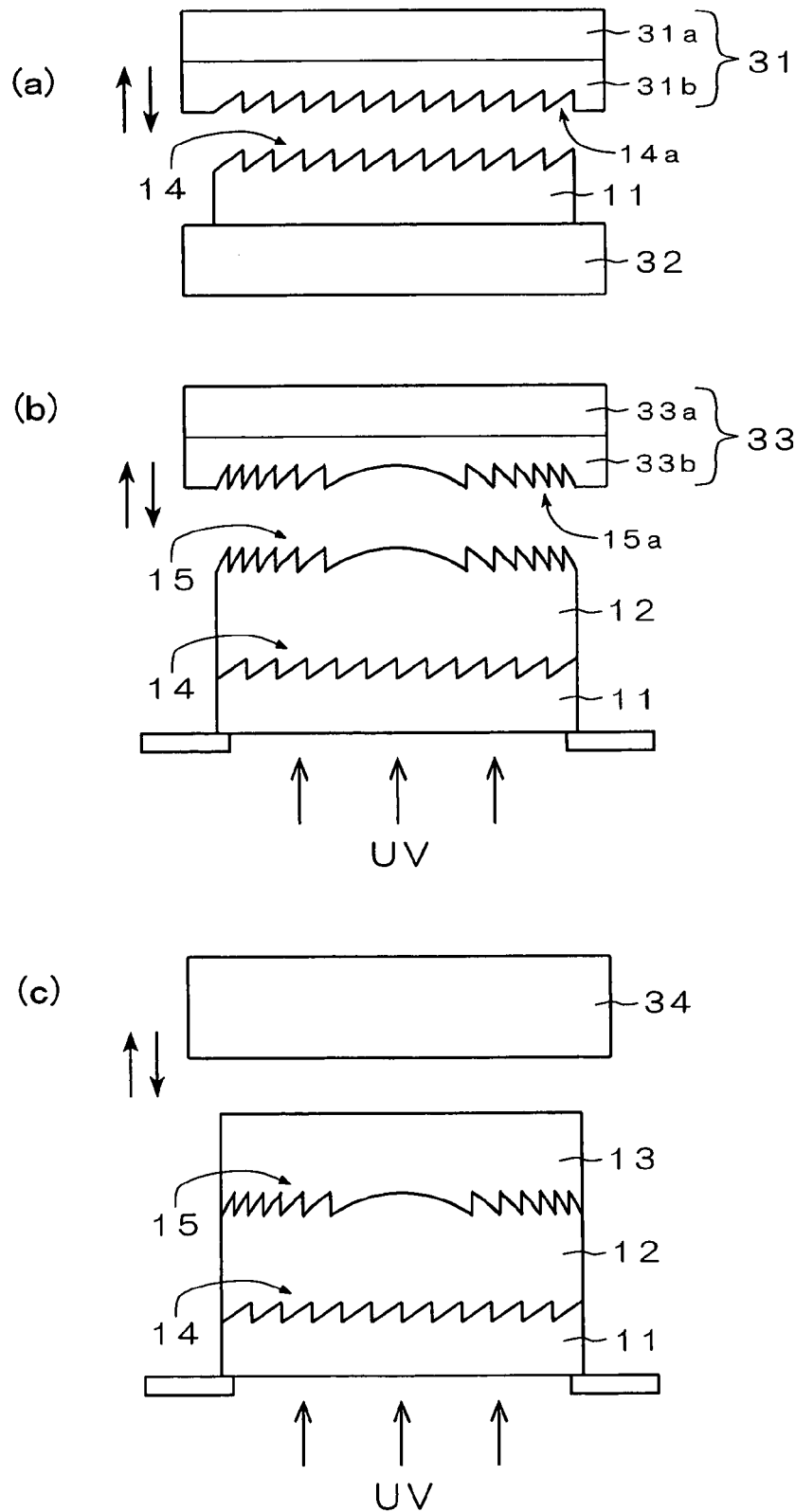
FIGS. 7(a) to (c) are schematic diagrams showing a step of producing a diffractive optical element 10 according to a third embodiment.

First of all, step 11 of producing the diffractive optical element 10 according to the third embodiment will be described. At step 11, as shown in FIG. 7(a), two molds 31 and 32 are used. The mold 31 has an uneven pattern in an inverted shape of that of the uneven pattern 14 (hereinafter referred to as inverted pattern 14a). The other mold 32 has a tabular shape and does not have an uneven pattern.

The mold 31 is produced as follows. A STAVAX® member 31a is used for a material of the mold. An Ni—P plated layer 31b with a thickness of around 150 μm is formed on the STAVAX® member 31a by electroless plating method. Thereafter, the Ni—P plated layer 31b is cut so as to form the inverted pattern 14a.

At step 11 in which the two molds 31 and 32 are used, the optical material of the layer 11 (low melting point glass K-PSK60) is clamped by the two molds 31 and 32 while being heated in a nitrogen atmosphere (at a maximum of 420° C.). This transfers the uneven pattern of the inverted pattern 14a of the mold 31 to the surface of the layer 11 (glass mold method). Then, by removing the two molds, the uneven pattern 14 is formed on the surface of the layer 11 (as shown in FIG. 7(a)).

Next, step 12 in which the diffractive optical element 10 according to the third embodiment is produced will be described. At step 12, as shown in FIG. 7(b), one mold 33 is used. The mold 33 has formed thereon an inverted pattern 15a of the uneven pattern 15.

The mold 33 is produced in the same manner as the foregoing mold 31. First of all, an Ni—P plated layer 33b (with a thickness of around 150 μm) is formed on a STAVAX® member 33a as a material of the mold 33. Thereafter, the Ni—P plated layer 33b is cut so as to form the inverted pattern 15a.

At step 12 in which the mold 33 is used, a non-cured material of the optical material (urethane acrylate type UV-curable resin) of the layer 12 is dripped on the uneven pattern 14 formed at step 11. The mold 33 is made in contact with the layer 12. The non-cured resin is filled into the space between the mold 33 and the layer 11. Thereafter, an ultraviolet ray is radiated from the below surface side of the layer 111 so as to cure the optical material of the layer 12. As a result, the uneven pattern of the inverted pattern 15a of the mold 33 is transferred to the surface of the layer 12. Then, removing the mold 33 from the layer 12, the uneven pattern 15 is formed on the surface of the layer 12 (as shown in FIG. 7(b)).

Finally, step 13 in which the diffractive optical element 10 according to the third embodiment is produced will be described. At step 13, as shown in FIG. 7(c), one mold 34 is used. The mold 34 has a tabular shape and does not have an uneven pattern.

At step 13 in which the mold 34 is used, a non-cured material of the optical material (fluorine contained methacrylate UV-curable resin) of the layer 13 is dripped on the uneven pattern 15 formed at step 12. The mold 34 is in contact with the layer 13. The non-cured resin is filled into the space between the mold 34 and the layer 12. Thereafter, an ultraviolet ray is radiated from the below surface side of the layer 11 so as to cure the optical material of the layer 13. As a result, the tabular shape of the mold 34 is transferred to the surface of the layer 13. Then, removing the mold 34 from the layer 13, the layer 12 has a plain surface (as shown in FIG. 7(c)).

In such a manner, the diffractive optical element 10 including the multilayer member 10a having the two uneven patterns 14 and 15 alternatively formed therein according to the third embodiment is obtainable. The diffractive optical element 10 can simultaneously realize both of the lens function and spectroscopic function by itself.

At steps 11 to 13 according to the third embodiment, it is easy to form the uneven patterns 14 and 15 of the diffractive optical element 10 by using the molds 31 and 33 created in advance and transferring the inverted patterns 14a and 15a thereof.

It is also easy to produce the molds 31 and 33. This is because the inverted pattern 14a of the mold 31 is a simple equi-pitch linear pattern and the inverted pattern 15a of the mold 33 is also a simple concentric-circular pattern, which enables the Ni P plated layers 31b and 31b to be cut easily and accurately.

Thus, according to the third embodiment, it is able to produce with easiness the diffractive optical element 10 that can simultaneously realize both a lens function and a spectroscopic function (multi-function) as well as that is small in size and excellent in productivity.

(Fourth Embodiment)

Figure 4:
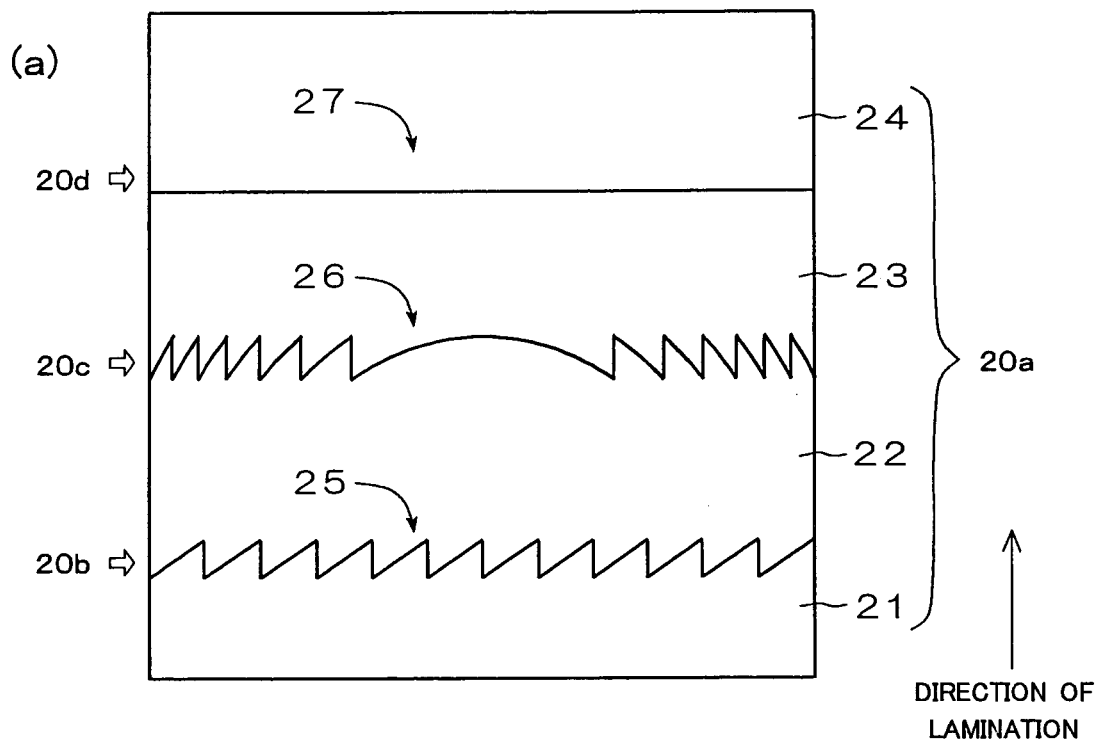
FIGS. 4(a), (b) are schematic diagrams showing the overall structure of a diffractive optical element 20 according to a second embodiment.
Figure 4:
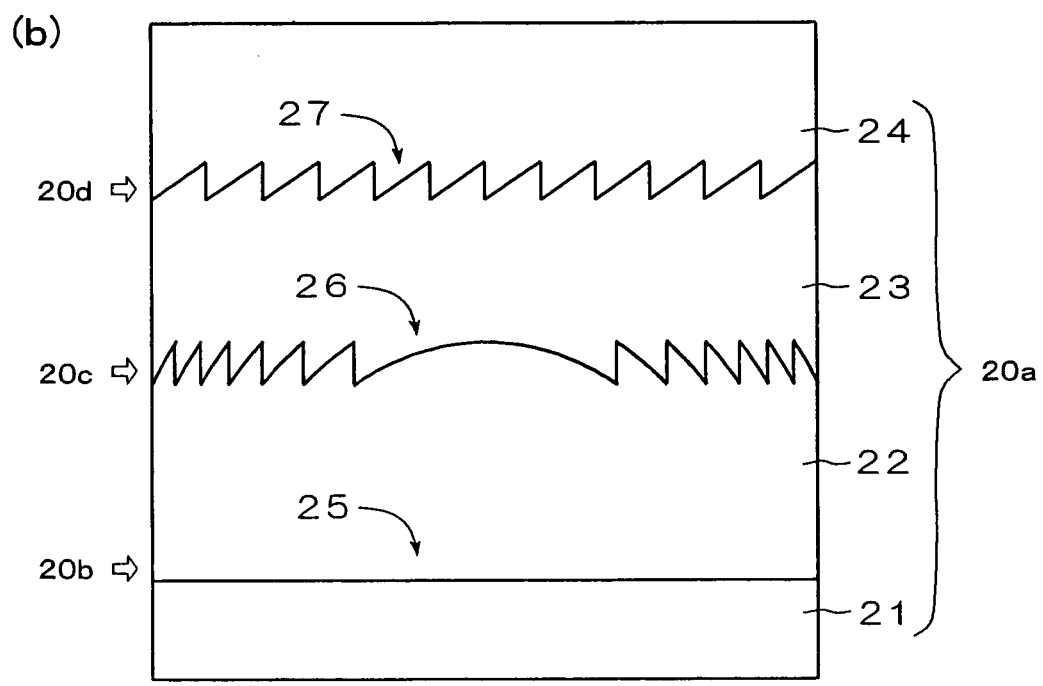

A fourth embodiment shows the diffractive optical element 20 according to the second embodiment in a specific manner (FIG. 4). In the following, the structure and producing steps of one compositional example of the multilayer member 20a of the diffractive optical element 20 will be described.

According to the fourth embodiment, a mixture (nd=1.490) of hexa-functional cyclourethane urethane acrylate and isobornyl methacrylate is used as the optical material of the layers 21 and 23. Ethoxyl bisphenol A dimethacrylate (nd=1.541) is used as the optical material of the layers 22 and 24. These four layers are alternatively laminated.

The uneven pattern 25 formed on the boundary face 20b of the adjacent layers 21 and 22 of the multilayer member 20a and the uneven pattern 27 formed on the boundary face 20d of the adjacent layers 23 and 24 have the same shape as that of the uneven pattern 14 according to the third embodiment. The orientations of the uneven patterns 25 and 27 are rotated by 90°. The uneven pattern 26 formed on the boundary face 20c of the adjacent layers 22 and 23 has the same shape as that of the uneven pattern 15 according to the third embodiment.

Steps in which the diffractive optical element 20 according to the fourth embodiment is produced are the same as steps 21 to 24 according to the second embodiment. At steps 21 to 23, the step 12 in the third embodiment is repeated three times, using, one at a time, molds having inverted shapes of those of the uneven patterns 25 to 27. At last step 24, a tabular mold similar to one used at step 13 according to the third embodiment is used.

In such a manner, the diffractive optical element 20 including the multilayer member 20a having the three uneven patterns 25 to 27 alternatively formed therein is obtainable. As described above, the diffractive optical element 20 can simultaneously realize the lens function and two types of spectroscopic functions by itself.

Through steps 21 to 24 according to the fourth embodiment, it is possible to easily form the uneven patterns 25 to 27 of the diffractive optical element 20 by using the molds produced in advance to transfer their inverted patterns. Moreover, it is also possible to produce the molds easily and accurately because the inverted patterns of the molds are simple equi-pitch linear patterns and concentric-circular patterns.

Thus, according to the fourth embodiment, it is able to produce with easiness the diffractive optical element 20 that attains both of the lens function and two types of spectroscopic functions (multiple functions) and that is small in size and excellent in productivity.

Figure 8:
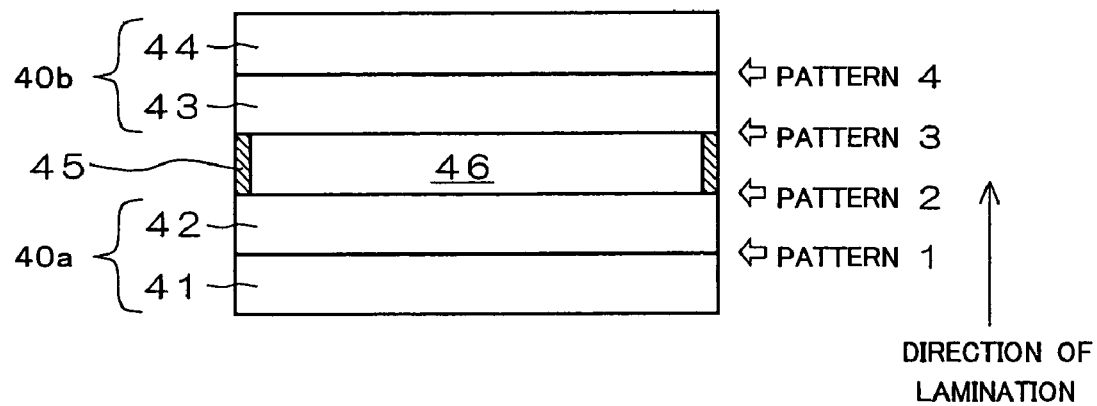
FIG. 8 is a schematic diagram showing a modified diffractive optical element 40.

The foregoing embodiments or examples have described on the diffractive optical elements 10 and 20 each composed of one multilayer member (10a or 20a), however, the present invention is not limited thereto. For example, a diffractive optical element 40 as shown in FIG. 8 may be composed of two multilayer members 40a and 40b.

The multilayer member 40a of the diffractive optical element 40 are composed of two layers. Uneven patterns in diffraction grating shape (patterns 1 and 2) are formed on the boundary face of the adjacent layers 41 and 42 and on the surface of the layer 42. Likewise, the multilayer member 40b is composed of two layers. Uneven patterns in diffraction grating shape (patterns 3 and 4) are formed on the boundary face of adjacent layers 43 and 44 and on the surface of the layer 43, respectively.

In this diffractive optical element 40, moreover, an optical material 46 is filled into the space between the two multilayer members 40a and 40b, namely between a surface (pattern 2) of the layer 42 and a surface (pattern 3) of the layer 43, and sealed with a sealing member 45. The sealing member 45 is adhesive rubber or the like, and also integrates the two multilayer members 40a and 40b.

The optical material 46 is gas or liquid whose refractive index is different from those of the adjacent layers 42 and 43. It is assumed that the inside of the optical material 46 is almost free from variation in the refractive index since the optical material 46 are sealed by the sealing member 45.

The liquid used as the optical material 46 may be, for example, pure water, a conventional solvent categorized as an alcohol group, an ether group, or an ester group, or an immersion liquid (of a known refractive index, used for a microscopic observation by immersion method). The immersion liquid may be, for example, bromo-naphthalene or di-n-butyl sebacic acid. The gas used as the optical material 46 may be air or inert gas such as nitrogen or argon.

The present invention makes it possible to provide a single small diffractive optical element which can simultaneously realize a plurality of optical functions by itself and is easy to produce.

The invention is not limited to the above embodiments and various modifications may be made without departing from the spirit and scope of the invention. Any improvement may be made in part or all of the components.

What is claimed is:

1. A diffractive optical element, comprising
a multilayer member composed of a plurality of layers each of which is made of an optical material, wherein:
adjacent layers in the multilayer member are in contact with each other, and have different refractive indexes from each other;
the multilayer member has therein one or more boundary face(s) between the contacted adjacent layers;
an uneven pattern is formed on each of at least two faces of three or more faces including the one or more boundary face(s) and outer surfaces of the multilayer member, the uneven pattern causing transmitted light to undergo an intended diffraction;
the uneven patterns formed on different faces have at least one of different shapes and different sizes from each other in a direction in which the layers of the multilayer member extend, such that the uneven patterns do not match each other when viewed in a direction that is orthogonal to the direction in which the layers extend; and a difference in the refractive indexes between all the adjacent layers on which the uneven patterns are formed is more than 0.01, and all the uneven patterns that are formed on the boundary face of the adjacent layers have heights that are set by taking into consideration the difference of the refractive indexes between the adjacent layers.

2. The diffractive optical element as set forth in claim 1, wherein:

the multilayer member includes two or more resin layers each of which is made of a resin optical material;

at least two of the two or more resin layers are in contact with each other at their adjacent positions; and at least one of the uneven patterns is formed on a boundary face between the contacted resin layers.

3. An optical apparatus, comprising the diffractive optical element as set forth in claim 2, wherein the diffractive optical element is disposed in a predetermined optical path of the optical apparatus such that the faces on which the uneven patterns are formed cross the predetermined optical path.

4. The optical apparatus as set forth in claim 3, wherein:

the optical apparatus uses a laser beam;

each of the layers of the diffractive optical element is made of an optical material that is transparent in a wavelength band of the laser beam; and the faces on which the uneven patterns are formed cross an optical path of the laser beam.

5. The optical apparatus as set forth in claim 4, wherein the wavelength band of the laser beam used by the optical apparatus is an infrared wavelength band of 1.4 μm to 1.7 μm.

6. An optical apparatus, comprising the diffractive optical element as set forth in claim 1, wherein the diffractive optical element is disposed in a predetermined optical path of the optical apparatus such that the faces on which the uneven patterns are formed cross the predetermined optical path.

7. The optical apparatus as set forth in claim 6, wherein:

the optical apparatus uses a laser beam;

each of the layers of the diffractive optical element is made of an optical material that is transparent in a wavelength band of the laser beam; and the faces on which the uneven patterns are formed cross an optical path of the laser beam.

8. The optical apparatus as set forth in claim 7, wherein the wavelength band of the laser beam used by the optical apparatus is an infrared wavelength band of 1.4 μm to 1.7 μm.

9. A diffractive optical element, comprising a multilayer member composed of three or more layers each of which is made of an optical material, wherein:

adjacent layers in the multilayer member are in contact with each other, and have different refractive indexes from each other;

the multilayer member has therein two or more boundary faces between the contacted adjacent layers;

an uneven pattern is formed on each of at least two of the two or more boundary faces, the uneven pattern causing transmitted light to undergo an intended diffraction;

the uneven patterns formed on different faces have at least one of different shapes and different sizes from each other in a direction in which the layers of the multilayer member extend, such that the uneven patterns do not match each other when viewed in a direction that is orthogonal to the direction in which the layers extend; and a difference in the refractive indexes between all the adjacent layers on which the uneven patterns are formed is more than 0.01, and all the uneven patterns that are formed on the boundary face of the adjacent layers have heights that are set by taking into consideration the difference of the refractive indexes between the adjacent layers.

10. The diffractive optical element as set forth in claim 9, wherein:

the multilayer member includes two or more resin layers each of which is made of a resin optical material;

at least two of the two or more resin layers are in contact with each other at their adjacent positions; and at least one of the uneven patterns is formed on a boundary face between the contacted resin layers.

11. An optical apparatus, comprising the diffractive optical element as set forth in claim 10, wherein the diffractive optical element is disposed in a predetermined optical path of the optical apparatus such that the faces on which the uneven patterns are formed cross the predetermined optical path.

12. The optical apparatus as set forth in claim 11, wherein:

the optical apparatus uses a laser beam;

each of the layers of the diffractive optical element is made of an optical material that is transparent in a wavelength band of the laser beam; and the faces on which the uneven patterns are formed cross an optical path of the laser beam.

13. The optical apparatus as set forth in claim 12, wherein the wavelength band of the laser beam used by the optical apparatus is an infrared wavelength band of 1.4 μm to 1.7 μm.

14. An optical apparatus, comprising the diffractive optical element as set forth in claim 9, wherein the diffractive optical element is disposed in a predetermined optical path of the optical apparatus such that the faces on which the uneven patterns are formed cross the predetermined optical path.

15. The optical apparatus as set forth in claim 14, wherein:

the optical apparatus uses a laser beam;

each of the layers of the diffractive optical element is made of an optical material that is transparent in a wavelength band of the laser beam; and the faces on which the uneven patterns are formed cross an optical path of the laser beam.

16. The optical apparatus as set forth in claim 15, wherein the wavelength band of the laser beam used by the optical apparatus is an infrared wavelength band of 1.4 μm to 1.7 μm.

17. A method of producing a diffractive optical element composed of layers, in which uneven patterns are formed between two adjacent layers, respectively, to cause transmitted light to undergo an intended diffraction, and the uneven patterns have, at least one of different shapes and different sizes from each other in a direction in which the layers extend, such that the uneven patterns do not match each other when viewed in a direction that is orthogonal to the direction in which the layers extend, the method comprising:
- a first step of forming a first uneven pattern on a surface of a layer made of a predetermined optical material; and
- a second step of forming a resin layer made of a resin optical material on the first uneven pattern and forming a second uneven pattern on a surface of the resin layer, the resin optical material having a refractive index that is different from a refractive index of the predetermined optical material, wherein the first uneven pattern has a height that is set by taking into consideration a difference in the refractive indexes between the predetermined optical material and the resin layer formed on the first uneven pattern, and the difference in the refractive indexes between the predetermined optical material and the resin layer is more than 0.01, and wherein the second step comprises:
- a first sub step of coating a non-cured material of the resin optical material on the first uneven pattern;
- a second sub step of bringing a mold having an inverted shape of the second uneven pattern into contact with the non-cured material; and
- a third sub step of curing the non-cured material with the mold contacted therewith.

18. The method of producing a diffractive optical element as set forth in claim 17, wherein in the third sub step the non-cured material is cured by light radiation.

* * * * *